US012394577B2

(12) United States Patent
Gaddi et al.

(10) Patent No.: US 12,394,577 B2
(45) Date of Patent: Aug. 19, 2025

(54) TWO-STAGE ACTUATION IN MEMS OHMIC RELAYS

(71) Applicant: Qorvo US, Inc., Greensboro, NC (US)

(72) Inventors: Roberto Gaddi, Rosmalen (NL); Robertus Petrus Van Kampen, S-Hertogenbosch (NL)

(73) Assignee: Qorvo US, Inc., Greensboro, NC (US)

( * ) Notice: Subject to any disclaimer, the term of this patent is extended or adjusted under 35 U.S.C. 154(b) by 399 days.

(21) Appl. No.: 17/957,856

(22) Filed: Sep. 30, 2022

(65) Prior Publication Data

US 2023/0140449 A1 May 4, 2023

Related U.S. Application Data

(60) Provisional application No. 63/275,851, filed on Nov. 4, 2021, provisional application No. 63/275,571, filed on Nov. 4, 2021.

(51) Int. Cl.
*H01H 1/00* (2006.01)
*H01H 59/00* (2006.01)

(52) U.S. Cl.
CPC ...... *H01H 1/0036* (2013.01); *H01H 59/0009* (2013.01); *H01H 2001/0084* (2013.01)

(58) Field of Classification Search
CPC ............. H01H 1/0036; H01H 59/0009; H01H 2001/0084; H01H 59/00; H01H 1/003; H01H 1/00; B81B 3/0064; B81B 3/0067; B81B 3/0078; B81B 3/0094; B81B 3/0097; B81B 7/0006; B81B 7/008; B81B 2201/01; B81B 2203/01; B81B 2203/0109; B81B 2207/03
USPC ........................................................... 200/181
See application file for complete search history.

(56) References Cited

U.S. PATENT DOCUMENTS

| | | | | |
|---|---|---|---|---|
| 7,864,491 | B1 | 1/2011 | Bauder et al. | |
| 9,156,677 | B2 | 10/2015 | Bauder et al. | |
| 10,770,253 | B2 | 9/2020 | Khlat et al. | |
| 11,640,891 | B2 * | 5/2023 | Gaddi ................ | H01H 59/0009 335/78 |
| 12,051,554 | B2 * | 7/2024 | Gaddi ................ | H01H 59/0009 |

(Continued)

OTHER PUBLICATIONS

Basu, Anirban, et al., "Leading and Trailing Edge Hot Switching Damage in a Metal Contact RF MEMS Switch," Transducers and Eurosensors, Jun. 2013, Barcelona, Spain, IEEE, pp. 514-517.

(Continued)

*Primary Examiner* — Lheiren Mae A Caroc
(74) *Attorney, Agent, or Firm* — Withrow & Terranova, P.L.L.C.

(57) ABSTRACT

A microelectromechanical system (MEMS) switch includes a movable beam suspended over a first set of conductive contacts and a second set of conductive contacts. Actuation of the MEMS switch occurs in two stages. During actuation of the MEMS switch, the movable beam is brought into contact with the first set of conductive contacts in a first stage of actuation. A first conduction path is created when the movable beam contacts the first set of conductive contacts. Continued actuation of the MEMS switch causes the movable beam to contact the second set of conductive contacts in a second stage of actuation. A second conduction path is created when the movable beam contacts the second set of conductive contacts.

8 Claims, 12 Drawing Sheets

(56) References Cited

U.S. PATENT DOCUMENTS

2022/0293382 A1* 9/2022 Van Kampen ..... H01H 59/0009
2024/0412935 A1* 12/2024 Van Kampen ....... H01H 1/0036

OTHER PUBLICATIONS

Dickrell, Daniel, III, et al., "Electrical Contact Resistance Degradation of a Hot-Switched Simulated Metal MEMS Contact," vol. 30, Issue 1, Mar. 2007, IEEE, pp. 75-80.

Liu, Y. et al., "Extension of the Hot-Switching Reliability of RF-MEMS Switches Using a Series Contact Protection Technique," IEEE Transactions on Microwave Theory and Techniques, vol. 64, Issue 10, Oct. 2016, first published Aug. 2016, IEEE, 13 pages.

Liu, Y. et al., "High-Power High-Isolation RF-MEMS Switches With Enhanced Hot-Switching Reliability Using a Shunt Protection Technique," IEEE Transactions on Microwave Theory and Techniques, vol. 65, Issue 9, Sep. 2017, first published Apr. 2017, IEEE, 13 pages.

Zhang, Y. et al., "Design of a high power MEMS relay with zero voltage switching and isolated power and signal transfer," 2018 IEEE Applied Power Electronics Conference and Exposition (APEC), Mar. 4-8, 2018, San Antonio, TX, USA, IEEE, 7 pages.

Notice of Allowance for U.S. Appl. No. 16/174,416, mailed May 14, 2020, 8 pages.

* cited by examiner

TWO-STAGE ACTUATION IN MEMS OHMIC RELAYS

CROSS-REFERENCE TO RELATED APPLICATIONS

This application claims the benefit of U.S. Provisional Patent Application Ser. No. 63/275,571 and the benefit of U.S. Provisional Patent Application Ser. No. 63/275,851, both filed on Nov. 4, 2021, the disclosures of which are hereby incorporated herein by reference in their entireties.

FIELD OF THE DISCLOSURE

Embodiments of the disclosure generally relate to micro-electro-mechanical system (MEMS) switches or MEMS relays for use in electrical circuits. More particularly, embodiments of the disclosure relate to MEMS switches or MEMS relays that actuate or switch to an on state in two stages.

BACKGROUND

MEMS switches and MEMS relays (hereinafter "MEMS switch" or "MEMS switches") are used in many types of applications, from wireless communications to consumer products. For example, MEMS switches are currently one of the best available options for an implementation of very high-performance switches that operate from direct current (DC) up to radio frequency (RF) and millimeter wave spectrum ranges. For this technology to be successfully adopted in state-of-the-art transmitting and/or receiving radio frequency devices, the reliability of the MEMS switch in terms of mean time to failure and ruggedness is evaluated against application-level requirements. While the performance benefits of MEMS technology are widely recognized both in the industry and in the academic world, its real or perceived shortcomings in terms of reliability have been a long-standing issue that has delayed wide scale adoption of MEMS technology.

One aspect related to the reliability of MEMS technology is the effect of switching (either opening or closing the switch) while DC or RF power is applied, a use condition often referred to as "hot switching." To date, hot switching has been addressed in two ways. One approach is a system-level specification to avoid presenting the MEMS switch with significant power during switching events. This safe-operating-conditions approach is unfortunately not always an option, and there are applications where it is impossible or extremely cumbersome to implement.

A second approach is the combination of the MEMS switch with a secondary protection switch, implemented in a different technology that is more rugged from a hot switching perspective. One problem with the second approach is that it typically degrades the key RF performance benefits offered by the MEMS device, making the MEMS switch and the secondary protection switch less appealing compared with traditionally non-MEMS implementations.

SUMMARY

Embodiments disclosed herein provide techniques for limiting a power level (e.g., a voltage level) presented to a microelectromechanical system (MEMS) switch during the opening transition event and the closing transition event. The techniques can enable a significant extension in the reliability of the MEMS switches in terms of the number of operating life cycles and/or maximum power handling. By appropriate fabrication process and device design, this protection is implemented within the same intrinsic MEMS switch, in the form of a two-stage transition: a first stage addresses voltage suppression across a dedicated conduction path with current limiting resistance; and a second stage enables the main conduction path for signal transmission. This two-stage operation does not require extra circuitry or special provisions in the application.

In an aspect, a microelectromechanical system (MEMS) switch includes a first conductive contact, a second conductive contact, a third conductive contact, and a fourth conductive contact disposed over a substrate. The first conductive contact and the second conductive contact form a first set of conductive contacts, and the third conductive contact and the fourth conductive contact form a second set of conductive contacts. The first set of conductive contacts are positioned between the third conductive contact and the fourth conductive contact in the second set of conductive contacts. A movable beam is suspended over the first set of conductive contacts and the second set of conductive contacts. The first set of conductive contacts and the movable beam are operable to create a first conduction path when the movable beam contacts the first set of conductive contacts in a first stage of actuation of the MEMS switch. The second set of conductive contacts and the movable beam are operable to create a second conduction path when the movable beam contacts the second set of conductive contacts in a second stage of actuation of the MEMS switch.

In another aspect, a MEMS cell includes multiple MEMS switches operably connected in parallel, and a first conductor and a second conductor positioned in parallel below the multiple MEMS switches. Each switch includes a first conductive contact, a second conductive contact, a third conductive contact, and a fourth conductive contact disposed over a substrate. The first conductive contact and the second conductive contact form a first set of conductive contacts, and the third conductive contact and the fourth conductive contact form a second set of conductive contacts. The first set of conductive contacts are positioned between the third conductive contact and the fourth conductive contact in the second set of conductive contacts. A movable beam is suspended over the first set of conductive contacts and the second set of conductive contacts. The first conductive contact and the third conductive contact in a first set of MEMS switches are operably connected to the first conductor. The second conductive contact and the fourth conductive contact in a second set of MEMS switches are operably connected to the second conductor. The first set of MEMS switches includes one or more MEMS switches. The second set of MEMS switches includes one or more different MEMS switches.

In yet another aspect, a method of operating a MEMS switch includes initiating actuation of the MEMS switch and establishing a first conduction path between a first set of conductive contacts and a movable beam when the movable beam contacts the first set of conductive contacts during a first stage of actuation of the MEMs switch. A second conduction path is established between a second set of conductive contacts and the movable beam when the movable beam contacts the second set of conductive contacts during a second stage of actuation of the MEMs switch.

In another aspect, any of the foregoing aspects individually or together, and/or various separate aspects and features as described herein, may be combined for additional advantage. Any of the various features and elements as disclosed herein may be combined with one or more other disclosed features and elements unless indicated to the contrary herein.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

Figure 1A:
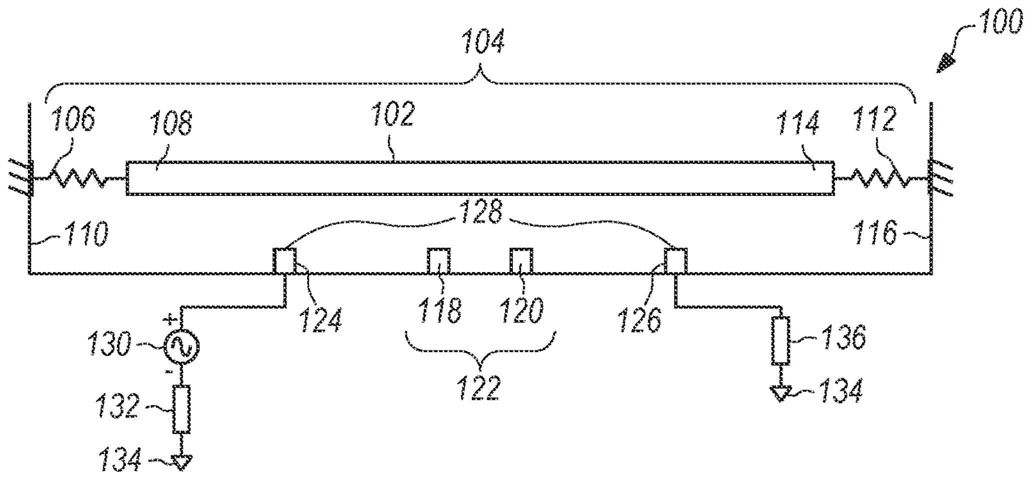
FIG. 1A illustrates a vertical cross-sectional view of a first MEMS switch in an open or off state.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments are described herein with reference to schematic illustrations of embodiments of the disclosure. As such, the actual dimensions of the layers and elements can be different, and variations from the shapes of the illustrations as a result, for example, of manufacturing techniques and/or tolerances, are expected. For example, a region illustrated or described as square or rectangular can have rounded or curved features, and regions shown as straight lines may have some irregularity. Thus, the regions illustrated in the figures are schematic and their shapes are not intended to illustrate the precise shape of a region of a device and are not intended to limit the scope of the disclosure. Additionally, sizes of structures or regions may be exaggerated relative to other structures or regions for illustrative purposes and, thus, are provided to illustrate the general structures of the present subject matter and may or may not be drawn to scale. Common elements between figures may be shown herein with common element numbers and may not be subsequently re-described.

The present disclosure relates to extending the reliability of a MEMS switch. The approaches according to the present disclosure are different from other known approaches which rely on external circuitry, mostly using hybrid technology, or added redundancy within the MEMS switch at the expense of performance. The improved reliability in the present disclosure has little to no impact on overall RF performance without the need of further provisions at the circuit level or system level in an application.

The underlying concept of the present disclosure is that a MEMS switch can be engineered in such a way that, during the actuation of the MEMS switch, the movable beam of the MEMS switch is brought into contact with multiple (sets of) conductive contacts, each set at a distinguished stage of the actuation of the MEMS switch. Contacting a first set of conductive contacts in a first stage of actuations limits the voltage level presented to the MEMS switch during opening and closing transition events. The first stage of actuation provides voltage suppression across a dedicated conduction path with a current limiting resistance. In a second stage of actuation, the movable beam contacts the first set of conductive contacts and a second set of conductive contacts. The second stage of actuation enables a second conduction path for signal transmission.

FIG. 1A illustrates a cross-sectional view of a first MEMS switch 100 in an open or turned off state. The cross-sectional view of the first MEMS switch 100 is taken along a plane where movement of a movable beam 102 occurs. The first MEMS switch 100 includes the movable beam 102 that spans across a cavity 104. The movable beam 102 is made of one or more conductive materials or is made of a combination of conductive and dielectric materials. In non-limiting nonexclusive examples, the movable beam 102 is made of titanium, titanium nitride, titanium aluminum, titanium aluminum nitride, aluminum, tungsten, platinum, iridium, rhodium, ruthenium, ruthenium oxide, molybdenum, indium tin oxide, silicon-dioxide, or combinations thereof.

A first attachment element 106 is used to attach a first end 108 of the movable beam 102 to a first anchor 110. A second attachment element 112 is used to attach a second end 114 of the movable beam 102 to a second anchor 116. The second end 114 of the movable beam 102 is opposite the first end 108 of the movable beam 102. In the illustrated embodiment, the first attachment element 106 and the second attachment element 112 are springs. In other embodiments, the first attachment element 106 and the second attachment element can be implemented differently.

A first stopper 118 and a second stopper 120 are disposed under the movable beam 102. The first stopper 118 and the second stopper 120 may be made of any suitable material or materials, such as a conductive material that is covered by an insulating material. The first stopper 118 and the second stopper 120 form a set of stoppers 122. Although FIG. 1A shows two (2) stoppers, other embodiments can include one or more stoppers.

A first conductive contact 124 and a second conductive contact 126 are disposed under the movable beam 102. The first conductive contact 124 and the second conductive contact 126 are made of a conductive material, such as titanium, titanium nitride, ruthenium, ruthenium oxide, titanium aluminum, titanium aluminum nitride, aluminum, tungsten, platinum, iridium, rhodium, molybdenum, indium tin oxide, or combinations thereof. The first conductive contact 124 and the second conductive contact 126 form a set of conductive contacts 128. Although FIG. 1A shows two conductive contacts, other embodiments can include one or more conductive contacts.

A signal source 130 is operably connected to the first conductive contact 124. The signal source 130 represents circuitry that provides a signal, such as a radio-frequency (RF) signal, to the first MEMS switch 100. A resistor 132 is operably connected between the signal source 130 and a reference voltage 134 (e.g., ground). A load 136 is operably connected between the second conductive contact 126 and the reference voltage 134.

The movable beam 102 is suspended over the set of stoppers 122 and the set of conductive contacts 128. In the illustrated embodiment, the set of stoppers 122 is positioned between the first conductive contact 124 and the second conductive contact 126. The movable beam 102 is operable to bend or deform to contact the set of stoppers 122 and the set of conductive contacts 128. As will be described in more detail in conjunction with FIG. 1B and FIG. 1C, the first MEMS switch 100 transitions to a closed or an on state through a two-stage actuation process.

Figure 1B:
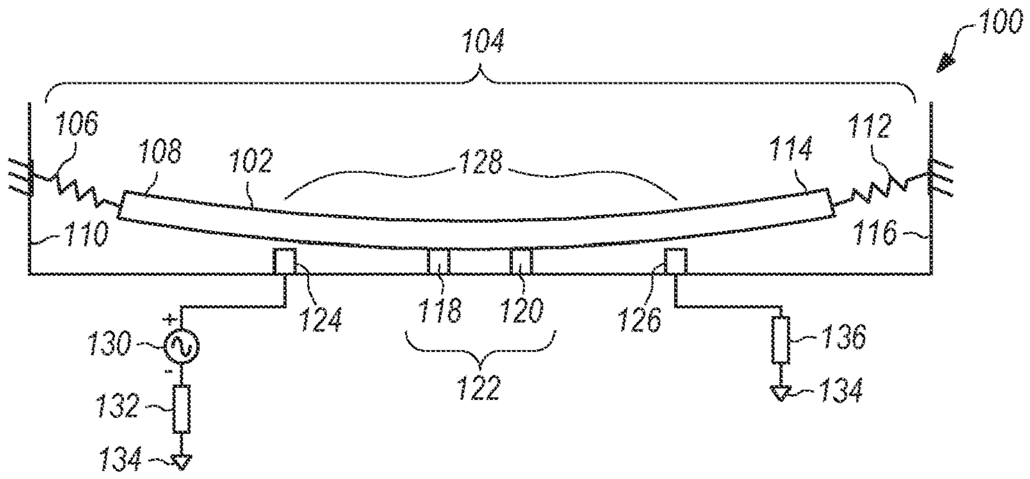
FIG. 1B illustrates the first MEMS switch shown in FIG. 1A activated and deformed to a point where the movable beam contacts a set of stoppers.

FIG. 1B illustrates the first MEMS switch 100 shown in FIG. 1A activated and deformed to a point where the movable beam 102 contacts the set of stoppers 122. To cause the movable beam 102 to bend downward, a power signal (e.g., a voltage signal) is applied to pull-down electrodes (not shown in FIG. 1) that are positioned in a substrate below the set of stoppers 122 and the set of conductive contacts 128. When the power signal is applied across the pull-down electrodes, the pull-down electrodes electrostatically pull the movable beam 102 downward. FIG. 1B depicts a first stage of actuation where the movable beam 102 is deformed and contacts the set of stoppers 122. If the set of stoppers 122 are covered by an insulating material, a conduction path is not created when the movable beam 102 contacts the set of stoppers 122. If the set of stoppers 122 are made of a conductive material, the set of stoppers 122 are electrically floating so a conduction path is not formed when the movable beam 102 contacts the set of stoppers 122.

Figure 1C:
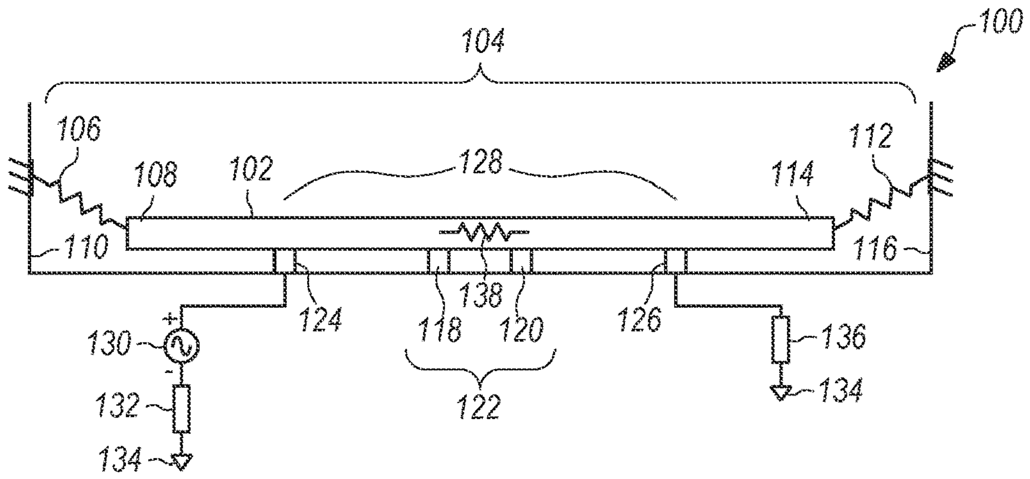
FIG. 1C illustrates the first MEMS switch shown in FIG. 1B activated and further deformed to a point where the movable beam contacts the set of stoppers and a set of conductive contacts.

FIG. 1C illustrates the first MEMS switch 100 shown in FIG. 1B activated and further deformed to a point where the movable beam 102 contacts the set of stoppers 122 and the set of conductive contacts 128. As the power signal continues to be applied across the pull-down electrodes, the pull-down electrodes electrostatically pull the movable beam 102 down further. FIG. 1C depicts a second stage of actuation where the movable beam 102 is deformed and contacts the set of stoppers 122 and the set of conductive contacts 128. Since the set of conductive contacts 128 are made of a conductive material, a conduction path is formed when the movable beam 102 contacts the set of conductive contacts 128. The first MEMS switch 100 is closed or turned on when the movable beam 102 contacts the set of conductive contacts 128, and a signal (e.g., an RF signal) is routed from the signal source 130 to the first conductive contact 124, from the first conductive contact 124 to the movable beam 102, across the movable beam 102 to the second conductive contact 126, and from the second conductive contact 126 to the load 136. A resistor symbol 138 represents an electrical resistance of the movable beam 102 as the signal propagates along the movable beam 102.

One issue with the first MEMS switch 100 is that during the closure of the first MEMS switch 100 (FIG. 1C), the first conductive contact 124 and the second conductive contact 126 are exposed to significant electric fields and electrical currents, which can potentially damage the first conductive contact 124 and the second conductive contact 126. When the first conductive contact 124 and/or the second conductive contact 126 are damaged, the reliability of the first MEMS switch 100 can be negatively impacted. For example, the movable beam 102 and one or both first conductive contact 124 and second conductive contact 126 can stick together, resulting in a functional failure of the first MEMS switch 100 (e.g., reduced OFF state isolation).

FIG. 2A through FIG. 13 disclose techniques that provide protection to a MEMS switch from electric fields and electrical currents during the closing or opening transients. In certain embodiments, a MEMS switch includes a first set of conductive contacts and a second set of conductive contacts. In the first stage of actuation, the movable beam contacts the first set of conductive contacts and a first conduction path is created. The first conduction path transmits a signal (e.g., a current at a low current level) that makes all conductive surfaces of the MEMS switch more equipotential. Thus, in the second stage of actuation, the electric fields and electrical currents exercised while the movable beam contacts both the first set of conductive contacts and the second set of conductive contacts are very much reduced, suppressing potential damage and the associated reliability implications.

Figure 2A:
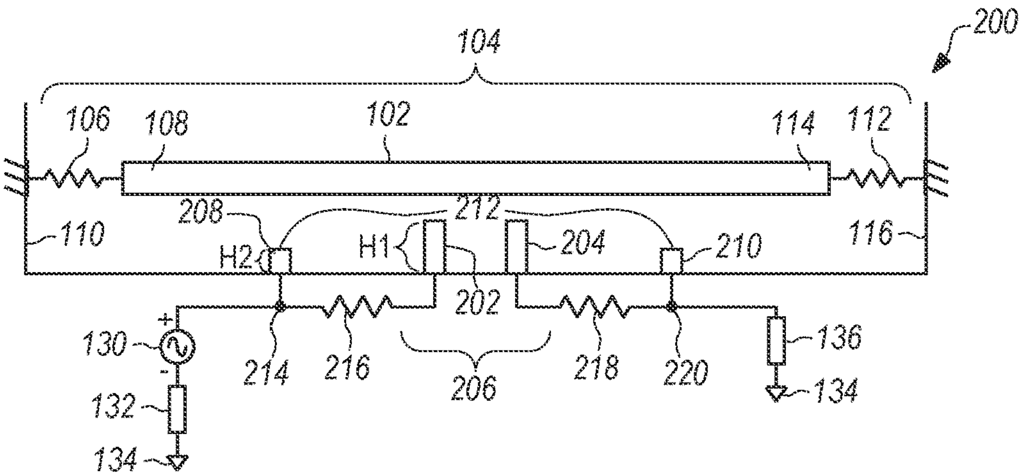
FIG. 2A illustrates a vertical cross-sectional view of a second MEMS switch in an open or off state in accordance with embodiments of the disclosure.

FIG. 2A illustrates a vertical cross-sectional view of a second MEMS switch 200 in an open or off state in accordance with embodiments of the disclosure. The cross-sectional view of the second MEMS switch 200 is taken along a plane where movement of the movable beam 102 occurs. The second MEMS switch 200 includes the movable beam 102 that spans across the cavity 104. The first attachment element 106 is used to attach the first end 108 of the movable beam 102 to the first anchor 110. The second attachment element 112 is used to attach the second end 114 of the movable beam 102 to the second anchor 116.

A first conductive contact 202 and a second conductive contact 204 are disposed under the movable beam 102. The first conductive contact 202 and the second conductive contact 204 form a first set of conductive contacts 206. A third conductive contact 208 and a fourth conductive contact 210 are disposed under the movable beam 102. The third conductive contact 208 and the fourth conductive contact 210 form a second set of conductive contacts 212. The first conductive contact 202, the second conductive contact 204, the third conductive contact 208, and the fourth conductive contact 210 are each made of a conductive material, such as titanium, titanium nitride, titanium aluminum, titanium aluminum nitride, aluminum, tungsten, platinum, iridium, rhodium, ruthenium, ruthenium oxide, molybdenum, or indium tin oxide. Although FIG. 2A shows four conductive contacts, other embodiments can include any number of conductive contacts.

The signal source 130 is operably connected to a first node 214. The third conductive contact 208 and a first resistor 216 are also operably connected to the first node 214. The first conductive contact 202 is operably connected to the first resistor 216. Thus, the first conductive contact 202 and the third conductive contact 208 are both operably connected to the signal source 130.

A second resistor 218 is operably connected between the second conductive contact 204 and a second node 220. The fourth conductive contact 210 and the load 136 are operably connected to the second node 220. The fourth conductive contact 210 is operably connected to the second node 220. Thus, the second conductive contact 204 and the fourth conductive contact 210 are both operably connected to the load 136. The load 136 is also operably connected to the reference voltage 134.

The movable beam 102 is suspended over the first set of conductive contacts 206 and the second set of conductive contacts 212. In the illustrated embodiment, the first set of conductive contacts 206 is positioned between the third conductive contact 208 and the fourth conductive contact 210. The movable beam 102 is operable to bend or deform to contact the first set of conductive contacts 206 and the second set of conductive contacts 212. As will be described in more detail in conjunction with FIG. 2B and FIG. 2C, the second MEMS switch 200 will transition to a closed or an on state through a two-stage actuation process.

In FIG. 2A, the first conductive contact 202 and the second conductive contact 204 are formed to have a first height H1. The third conductive contact 208 and the fourth conductive contact 210 are formed to have a second height H2, where H2 is less than H1. In other embodiments, the first conductive contact 202, the second conductive contact 204, the third conductive contact 208, and the fourth conductive contact 210 may all be formed to have the same height (e.g., H2). Due to the nature of the second MEMS switch 200, the movable beam 102 flexes and first contacts the centrally located first conductive contact 202 and the second conductive contact 204 before contacting the third conductive contact 208 and the fourth conductive contact 210 (e.g., as shown in FIG. 1B).

Figure 2B:
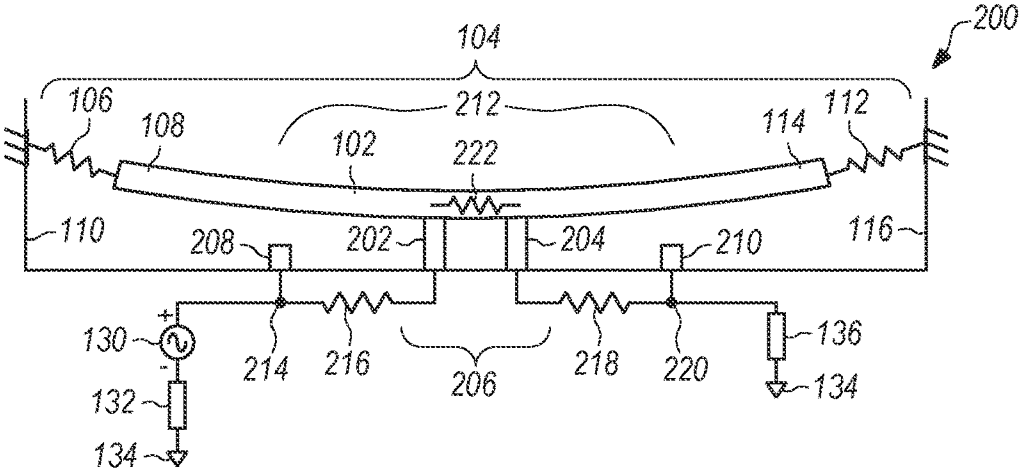
FIG. 2B illustrates the second MEMS switch shown in FIG. 2A activated and deformed to a point where the movable beam contacts a first set of conductive contacts in accordance with embodiments of the disclosure.

FIG. 2B illustrates the second MEMS switch 200 shown in FIG. 2A activated and deformed to a point where the movable beam 102 contacts the first set of conductive contacts 206 in accordance with embodiments of the disclosure. To cause the movable beam 102 to bend downward, a power signal (e.g., a voltage signal) is applied to pull-down electrodes (not shown in FIGS. 2A-2C) that are positioned in a substrate (not shown) below the first set of conductive contacts 206 and/or the second set of conductive contacts 212. When the power signal is applied across the pull-down electrodes, the pull-down electrodes electrostatically pull the movable beam 102 downward.

Since the first set of conductive contacts 206 are made of a conductive material, a first conduction path is formed between the signal source 130 and the load 136 when the movable beam 102 contacts the first set of conductive contacts 206. In particular, the first conduction path is created from the signal source 130 to the first resistor 216, from the first resistor 216 to the first conductive contact 202, from the first conductive contact 202 to the movable beam 102, from the movable beam 102 to the second conductive contact 204, from the second conductive contact 204 to the second resistor 218, and from the second resistor 218 to the load 136. A first signal (e.g., an RF signal) begins to transmit through the second MEMS switch 200 along the first conduction path. A resistor symbol 222 represents an electrical resistance of the movable beam 102 as the first signal propagates along the movable beam 102.

Figure 2C:
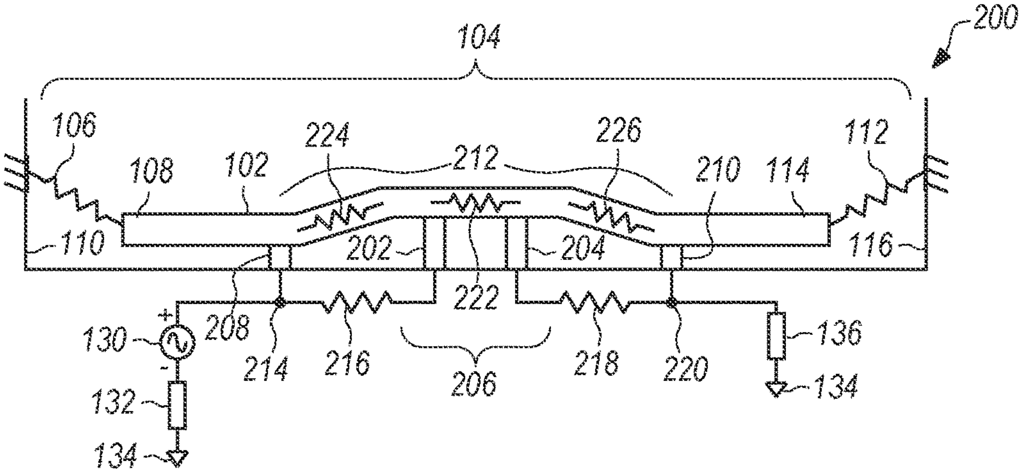
FIG. 2C illustrates the second MEMS switch shown in FIG. 2B activated and deformed to a point where the movable beam contacts the first set of conductive contacts and a second set of conductive contacts in accordance with embodiments of the disclosure.

FIG. 2C illustrates the second MEMS switch 200 shown in FIG. 2B activated and deformed to a point where the movable beam 102 contacts the first set of conductive contacts 206 and the second set of conductive contacts 212 in accordance with embodiments of the disclosure. As the power signal continues to be applied across the pull-down electrodes, the pull-down electrodes electrostatically pull the movable beam 102 down further until the movable beam 102 contacts both the first set of conductive contacts 206 and the second set of conductive contacts 212. Since the second set of conductive contacts 212 are made of a conductive material, a second conduction path is created in the second MEMS switch 200 when the movable beam 102 contacts the second set of conductive contacts 212. In particular, the second conduction path is created from the signal source 130 to the first node 214, from the first node 214 to the third conductive contact 208, from the third conductive contact 208 to the movable beam 102, from the movable beam 102 to the fourth conductive contact 210, from the fourth conductive contact 210 to the second node 220, and from the second node 220 to the load 136. A second signal (e.g., an RF signal) propagates through the second MEMS switch 200 along the second conduction path. The resistor symbols 224, 226 represent the electrical resistance of the movable beam 102 as the second signal propagates along the movable beam 102.

The second MEMS switch 200 is shown in FIG. 2C in the closed or on state. In the closed state, the first signal is routed from the signal source 130 to the load 136 along the first conduction path and the second signal is routed from the signal source 130 to the load 136 along the second conductive signal path. To open the second MEMS switch 200, the reverse process is performed. The second MEMS switch 200 transitions to the first stage shown in FIG. 2B and then transitions to the open state shown in FIG. 2A.

The signal source 130 generates a maximum available power $P_{SRC}$ and the load 136 has an impedance $Z_L$. In the open or off state shown in FIG. 2A, the second MEMS switch 200 isolates the signal source 130 from the load 136. In the closed or on state shown in FIG. 2C, the second MEMS switch 200 provides low loss transmission of the signal between the signal source 130 and the load 136. Therefore, a voltage across the second MEMS switch 200 in the off state is equal to the open-circuit voltage of the signal source, as shown in Equation 1.

$$V_{OFF}=V_S=\sqrt{8Z_L P_{SRC}} \quad \text{Equation 1}$$

When the second MEMS switch 200 transitions from the off state in FIG. 2A to the on state in FIG. 2C, the second MEMS switch 200 first reaches the first stage of actuation in FIG. 2B. As described earlier, the first conduction path between signal source 130 and the load 136 is established through the first resistor 216 and the second resistor 218 (each of value $R_{PL}$), and the first conductive contact 202 and the second conductive contact 204 (each of value $R_{C1}$). The movable beam 102 generates the electrical resistance represented by the resistor 222 (of value $R_{B1}$). The value of the first resistor 216, the value of the electrical resistance (resistor 222), and the value of the second resistor 218 in series define a voltage drop across the second MEMS switch 200 that can be characterized by the following Equation:

$$V_{RED} = V_{OFF}\frac{R_{SE}}{R_{SRC}+R_L+R_{SE}}, \quad \text{Equation 2}$$

$$\text{where } R_{SE} = 2R_{PL} + 2R_{C1} + R_{B1}$$

Both the signal source 130 and impedance of the load 136 are assumed real for simplicity.

The second MEMS switch 200 then reaches the second stage of actuation shown in FIG. 2C. In this configuration, the second conduction path is formed in parallel to the first conduction path. The second conduction path is through the third conductive contact 208 and the fourth conductive contact 210 (each of value $R_{CNT}$). The movable beam 102 generates the electrical resistances represented by the resistors 222, 224, 226 (resulting in a generalized beam resistance $R_{BEAM}$). The on state resistance of the second MEMS switch 200 may be defined by Equation 3:

$$R_{ON} = \frac{R_{SE}\widetilde{R_{ON}}}{R_{SE}+\widetilde{R_{ON}}}, \quad \text{Equation 3}$$

where $\widetilde{R_{ON}}=2R_{CNT}+R_{BEAM}$ is the on state resistance of a MEMS switch that does not include the hot switch protection. In certain embodiments, $\widetilde{R_{ON}} \ll R_{SE}$ and therefore $R_{ON}\approx\widetilde{R_{ON}}$, so the on state loss is not significantly different as a result of the introduction of the two-stage hot switch protection.

To quantify a level of protection that is achieved in the two-stage actuation in FIGS. 2A-2C, the reduction in voltage resulting from the second MEMS switch 200 at the first stage of actuation (FIG. 2B) can be transformed in an equivalent source power assuming no such hot switching protection was in place. As a result, an equivalent power reduction coefficient can be obtained as a function of the total series resistance $R_{SE}$ of the first resistor 216, the electrical resistance represented by the resistor 222, and the second resistor 218. The voltage reduction, which is one mechanism in the improved hot switch reliability, is fundamentally related to the value of the total series resistance presented by the second MEMS switch 200 after completing the first stage of actuation (FIG. 2B), where the first stage of actuation includes the first resistor 216 and the second resistor 218 (each of value $R_{PL}$), the first conductive contact 202 and the second conductive contact 204 (each of value $R_{C1}$), and the electrical resistance represented by the resistor 222 of the movable beam 102 (value $R_{B1}$).

Figure 3:
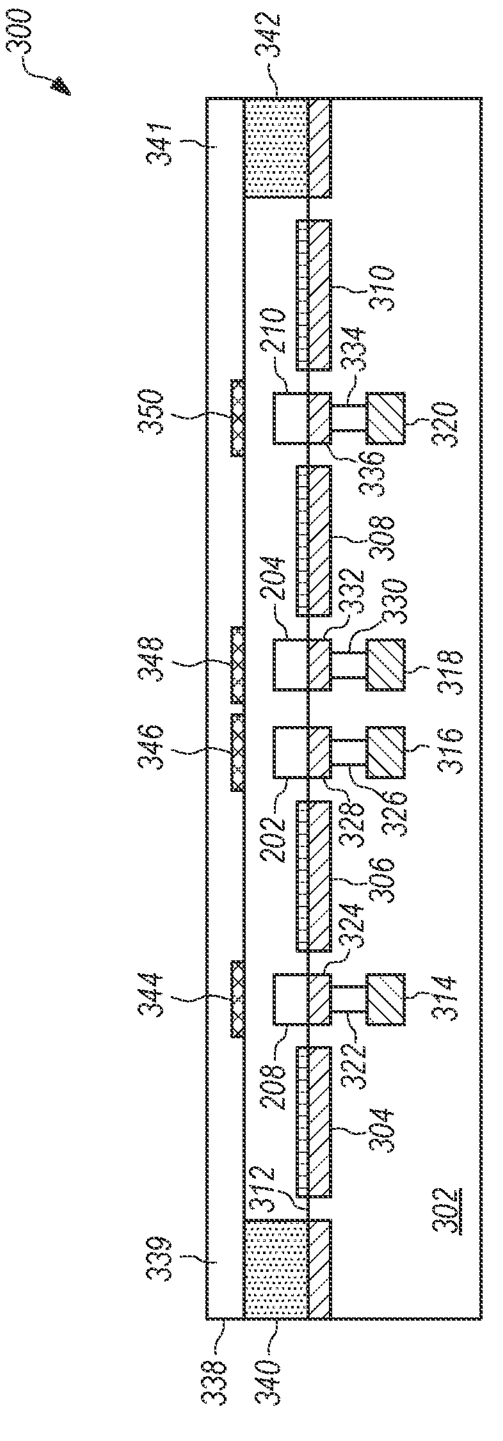
FIG. 3 illustrates a vertical cross-sectional view of a third MEMS switch in accordance with embodiments of the disclosure.

FIG. 3 illustrates a cross-sectional view of a third MEMS switch 300 in accordance with embodiments of the disclosure. The third MEMS switch 300 includes a substrate 302. A first pull-down electrode 304, a second pull-down electrode 306, a third pull-down electrode 308, and a fourth pull-down electrode 310 are disposed at and/or on a surface 312 of the substrate 302. A first conductor 314, a second conductor 316, a third conductor 318, and a fourth conductor 320 are disposed in the substrate 302. In certain embodiments, the first conductor 314, the second conductor 316, the third conductor 318, and the fourth conductor 320 are RF conductors. The first conductive contact 202, the second conductive contact 204, the third conductive contact 208, and the fourth conductive contact 210 are disposed on the surface 312 of the substrate 302.

A first conductive via 322 operably (e.g., electrically) connects the first conductor 314 to a first contact pad 324. The first contact pad 324 operably connects to the third conductive contact 208. Thus, the first conductor 314 is operably connected to the third conductive contact 208.

A second conductive via 326 operably connects the second conductor 316 to a second contact pad 328. The second contact pad 328 is operably connected to the first conductive contact 202. Thus, the second conductor 316 is operably connected to the first conductive contact 202.

A third conductive via 330 operably connects the third conductor 318 to a third contact pad 332. The third contact pad 332 is operably connected to the second conductive contact 204. Thus, the third conductor 318 is operably connected to the second conductive contact 204.

A fourth conductive via 334 operably connects the fourth conductor 320 to a fourth contact pad 336. The fourth contact pad 336 is operably connected to the fourth conductive contact 210. Thus, the fourth conductor 320 is operably connected to the fourth conductive contact 210.

A movable beam 338 is suspended over the substrate 302, the first conductive contact 202, the second conductive contact 204, the third conductive contact 208, and the fourth conductive contact 210. A first end 339 of the movable beam 338 is supported by a first attachment element 340 and a second end 341 of the movable beam 338 is supported by a second attachment element 342. The first attachment element 340 and the second attachment element 342 may each include one or more layers.

The movable beam 338 includes a first beam contact 344, a second beam contact 346, a third beam contact 348, and a fourth beam contact 350 that are each made of one or more conductive materials. The first beam contact 344 is aligned with the third conductive contact 208. The second beam contact 346 is aligned with the first conductive contact 202. The third beam contact 348 is aligned with the second conductive contact 204. The fourth beam contact 350 is aligned with the fourth conductive contact 210. When the movable beam 338 is in the first stage of actuation, the second beam contact 346 contacts the first conductive contact 202 and the third beam contact 348 contacts the second conductive contact 204. When the movable beam 338 is in the second stage of actuation, the first beam contact 344 contacts the third conductive contact 208, the second beam contact 346 contacts the first conductive contact 202, the third beam contact 348 contacts the second conductive contact 204, the fourth beam contact 350 contacts the fourth conductive contact 210.

Figure 4:
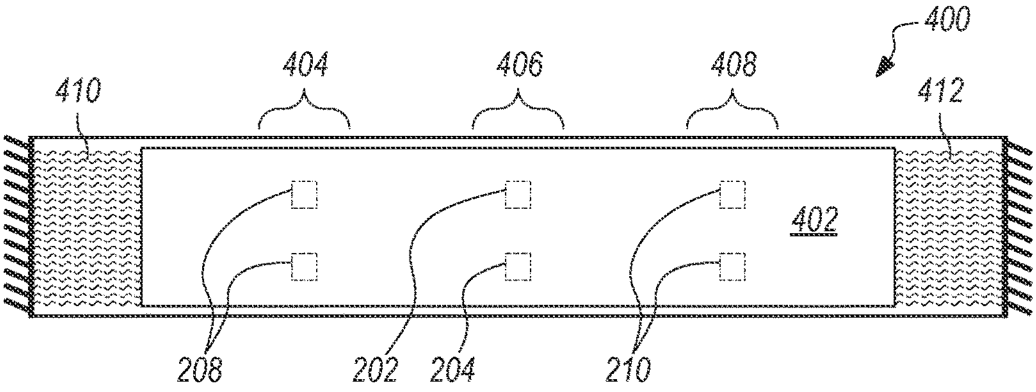
FIG. 4 illustrates a top view of a MEMS switch in accordance with embodiments of the disclosure.

FIG. 4 illustrates a top view of a MEMS switch 400 in accordance with embodiments of the disclosure. The MEMS switch 400 includes a movable beam 402 suspended over a first set of conductive contacts 404, a second set of conductive contacts 406, and a third set of conductive contacts 408. The first set of conductive contacts 404 includes a set of third conductive contacts 208. The second set of conductive contacts 406 includes a set of the first conductive contact 202 and the second conductive contact 204. The third set of conductive contacts 408 includes a set of fourth conductive contacts 210. The first set of conductive contacts 404, the second set of conductive contacts 406, and the third set of conductive contacts 408 are shown in dashed lines because they are not visible in the top view. Although FIG. 4 depicts three sets of conductive contacts, a MEMS switch can include one or more first conductive contacts 202, one or more second conductive contacts 204, one or more third conductive contacts 208, and one or more fourth conductive contacts 210.

The movable beam 402 can be configured as, or similar to, the movable beam 338 of FIG. 3. The movable beam 402 is held in suspension by a first attachment element 410 and a second attachment element 412. Any suitable attachment element can be used for the first attachment element 410 and the second attachment element 412. For example, the first attachment element 410 and the second attachment element 412 may be configured as springs (FIG. 1).

Figure 5:
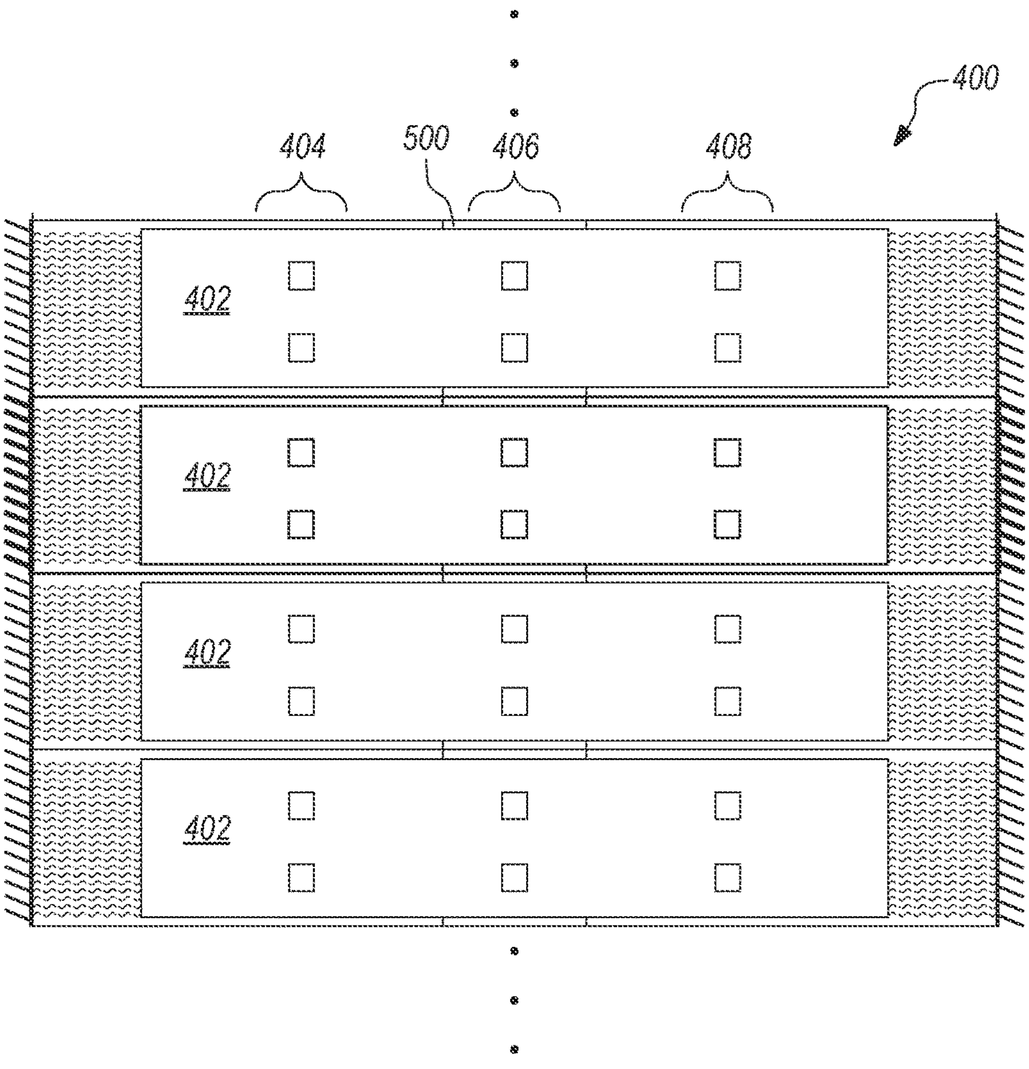
FIG. 5 illustrates a top view of multiple MEMS switches mechanically and electrically connected together in accordance with embodiments of the disclosure.

Multiple MEMS switches can be coupled together. FIG. 5 illustrates a top view of MEMS switches 400 mechanically and electrically connected together in accordance with embodiments of the disclosure. In the example embodiment, each pair of movable beams 402 is coupled together using a beam link 500. As such, the movable beams 402 are coupled in parallel. The beam link 500 can be made of the same material, or at least some of the same materials, as the movable beams 402.

Figure 6:
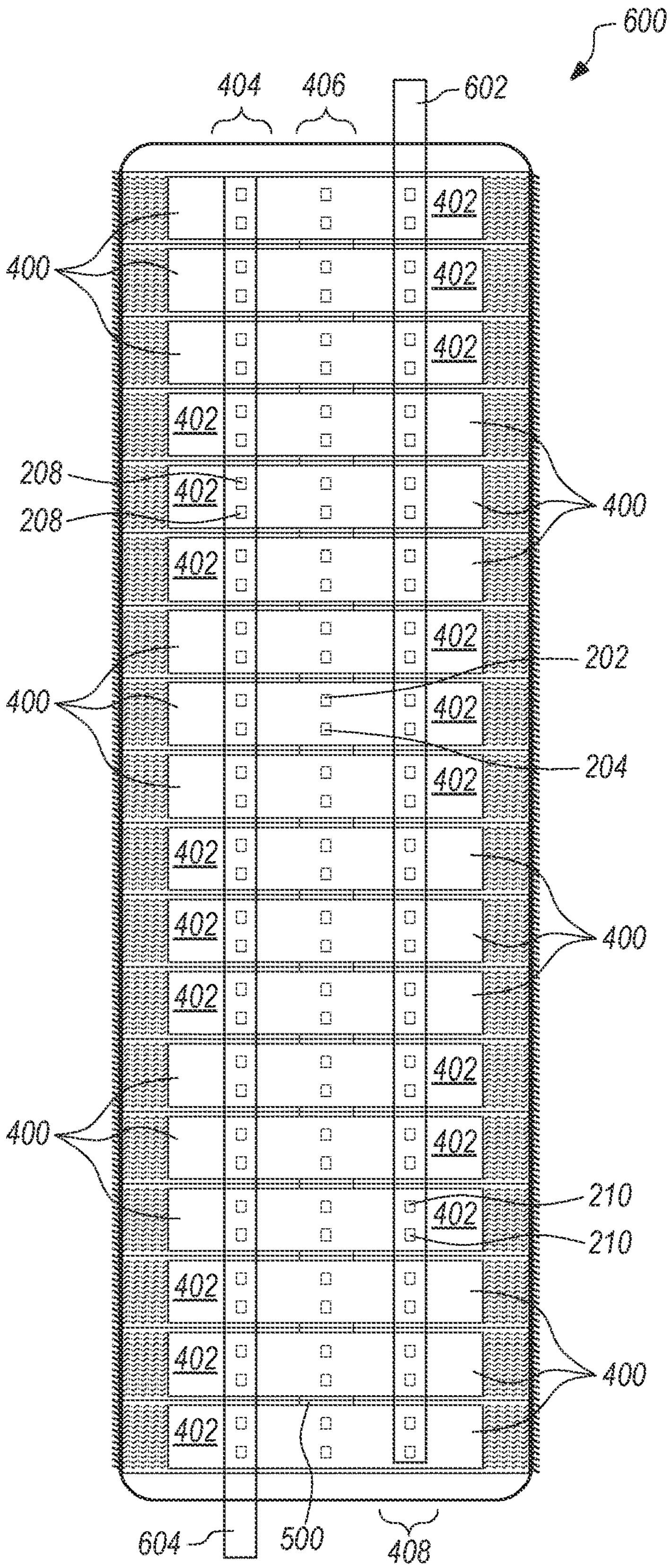
FIG. 6 illustrates a top view of a first cell in accordance with embodiments of the disclosure.

A cell of MEMS switches can be created by coupling multiple MEMS switches together. FIG. 6 illustrates a top view of a first cell 600 in accordance with embodiments of the disclosure. The first cell 600 includes multiple MEMS switches 400 electrically and mechanically coupled together by the beam link 500. In the example embodiment, the first cell 600 includes eighteen (18) MEMS switches 400 coupled together in parallel. Other embodiments are not limited to this configuration.

A first conductor 602 and a second conductor 604 are disposed transverse (e.g., perpendicular) to the movable beams 402 and in parallel below the MEMS switches 400 in the first cell 600. In certain embodiments, the first conductor 602 and the second conductor 604 are RF conductors. Conductive vias (e.g., the fourth conductive vias 334 in FIG. 3) are used to connect the fourth conductive contacts 210 in the third set of conductive contacts 408 to the first conductor 602. Conductive vias (e.g., the first conductive vias 322 in FIG. 3) are used to connect the third conductive contacts 208 in the first set of conductive contacts 404 to the second conductor 604. Based on this configuration, one can appreciate how all of the MEMS switches 400 in the first cell 600 are connected in parallel. Accordingly, the on state resistance of the entire first cell 600 is equal to (or substantially equal to) that of a single MEMS switch 400 divided by N, where N represents the number of MEMS switches 400 in the first cell 600.

Figure 7:
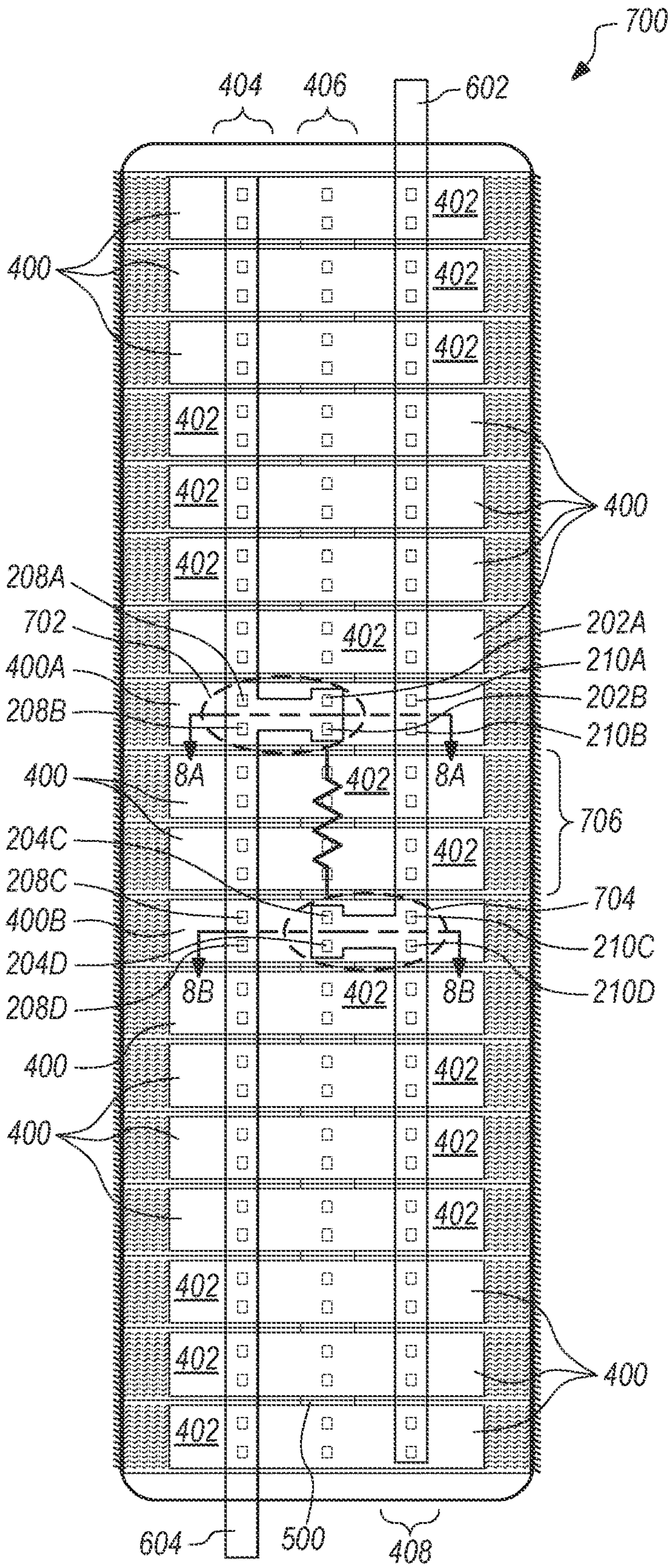
FIG. 7 illustrates a top view of a second cell in accordance with embodiments of the disclosure.

FIG. 7 illustrates a top view of a second cell 700 in accordance with embodiments of the disclosure. FIG. 7 is similar to FIG. 6, and further depicts a first group of first stage actuation contacts 702 and a second group of first stage actuation contacts 704. The first group of first stage actuation contacts 702 are included in the MEMS switch 400A. The first group of first stage actuation contacts 702 includes the second set of conductive contacts 406 electrically connected to the first set of conductive contacts 404. The third conductive contacts 208A, 208B in the first set of conductive contacts 404 are operably (e.g., electrically) connected to the second conductor 604. Additionally, the first conductive contacts 202A, 202B in the second set of conductive contacts 406 are also operably connected to the second conductor 604. In certain embodiments, all of the conductive contacts in the first set of conductive contacts 404 (including the third conductive contacts 208 (e.g., 208A, 208B, 208C, 208D)) in the second cell 700 are operably connected to the second conductor 604 and some, but not all, of the first conductive contacts 202 (e.g., 202A, 202B) in the second cell 700 are operably connected to the second conductor 604 (e.g., in MEMS switch 400A).

The second group of first stage actuation contacts 704 are included in a different MEMS switch 400B. The second group of first stage actuation contacts 704 includes a second set of conductive contacts 406 operably connected to the third set of conductive contacts 408. The fourth conductive contacts 210C, 210D in the third set of conductive contacts 408 are operably connected to the first conductor 602 and the second conductive contacts 204C, 204D are operably connected to the first conductor 602. In certain embodiments, all of the conductive contacts in the third set of conductive contacts 408 (including the fourth conductive contacts 210 (e.g., 210A, 210B, 210C, 210D)) in the second cell 700 are operably connected to the first conductor 602 and some, but not all, of the second conductive contacts 204 (e.g., 204C, 204D) in the second cell 700 are operably connected to the first conductor 602 (e.g., in MEMS switch 400B).

The portions of the movable beams 402 located between the first group of first stage actuation contacts 702 and the second group of first stage actuation contacts 704 form a movable beam section 706. When the second cell 700 is actuated to the first stage of actuation, the first conduction path is established within the second cell 700. The first conduction path includes the first group of first stage actuation contacts 702, the electrical resistance (represented by a resistor) of the movable beam section 706, and the second group of first stage actuation contacts 704. In general, due to the lack of parallelization in the first conduction path, the value of the total reduction resistance $R_{RED}$ can be higher than the on state cell resistance $R_{ON}$, but the actual value is a function of: the first and the second groups of first stage actuation contacts 702, 704; the resistivity of the material in the movable beam 402; and the geometry of the movable beams 402.

Figure 8A:
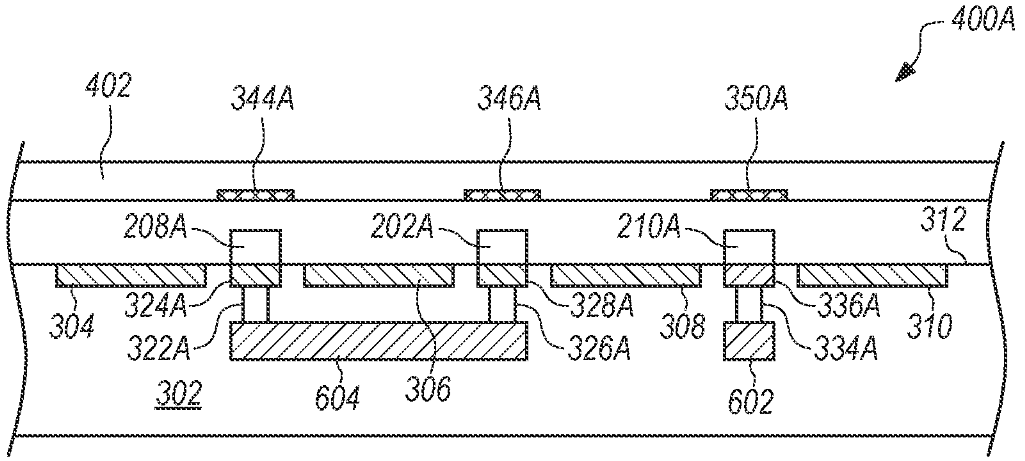
FIG. 8A illustrates a vertical cross-sectional view of a portion of the MEMS switch taken along line 8A-8A in FIG. 7 in accordance with embodiments of the disclosure.

FIG. 8A illustrates a vertical cross-sectional view of a portion of the MEMS switch 400A taken along line 8A-8A in FIG. 7 in accordance with embodiments of the disclosure. The MEMS switch 400A includes the third conductive contact 208A, the fourth conductive contact 210A, and the first conductive contact 202A positioned between the third conductive contact 208A and the fourth conductive contact 210A. The movable beam 402 with the first beam contact 344A, the second beam contact 346A, and the fourth beam contact 350A is suspended over the substrate 302 and the first conductive contact 202A, the third conductive contact 208A, and the fourth conductive contact 210A.

The fourth conductive contact 210A is operably connected to the first conductor 602 in the substrate 302 through the fourth conductive via 334A and the fourth contact pad 336A. The third conductive contact 208A is operably connected to the second conductor 604 in the substrate 302 through the first conductive via 322A and the first contact pad 324A. The first conductive contact 202A is operably connected to the second conductor 604 in the substrate 302 through the second conductive via 326A and the second contact pad 328A. Thus, both the first conductive contact 202A and the third conductive contact 208A are operably connected to the second conductor 604 and to each other through the second conductor 604.

Figure 8B:
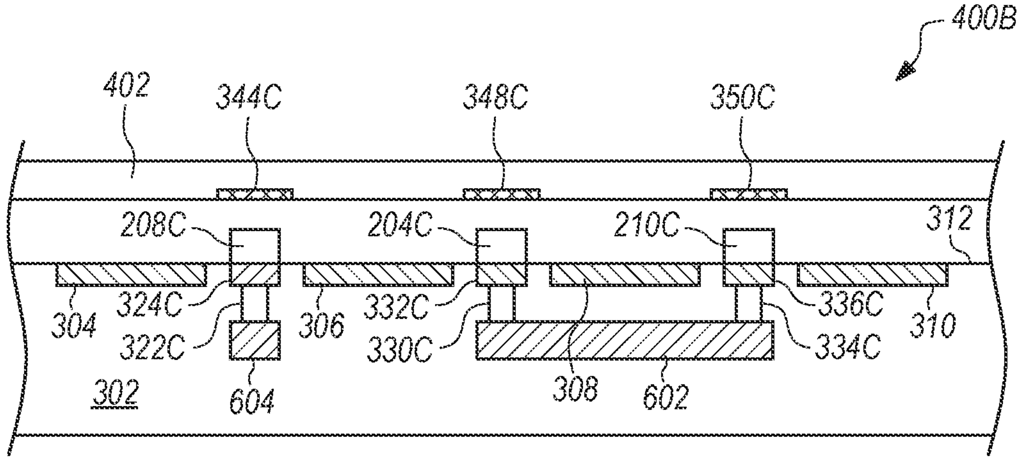
FIG. 8B illustrates a vertical cross-sectional view of a portion of the MEMS switch taken along line 8B-8B in FIG. 7 in accordance with embodiments of the disclosure.

FIG. 8B illustrates a vertical cross-sectional view of a portion of the MEMS switch 400B taken along line 8B-8B in FIG. 7 in accordance with embodiments of the disclosure. The MEMS switch 400B includes the third conductive contact 208C, the fourth conductive contact 210C, and the second conductive contact 204C positioned between the third conductive contact 208C and the fourth conductive contact 210C. The movable beam 402 with the first beam contact 344C, the third beam contact 348C, and the fourth beam contact 350C is suspended over the substrate 302, the third conductive contact 208C, the second conductive contact 204C, and the fourth conductive contact 210C.

The third conductive contact 208C is operably connected to the second conductor 604 in the substrate 302 through the first conductive via 322C and the first contact pad 324D. The second conductive contact 204C is operably connected to the first conductor 602 in the substrate 302 through the third conductive via 330C and the third contact pad 332C. The fourth conductive contact 210C is operably connected to the first conductor 602 in the substrate 302 through the fourth conductive via 334C and the fourth contact pad 336C. Thus, both the second conductive contact 204C and the fourth conductive contact 210C are operably connected to the first conductor 602 and to each other through the first conductor 602.

Figure 9:
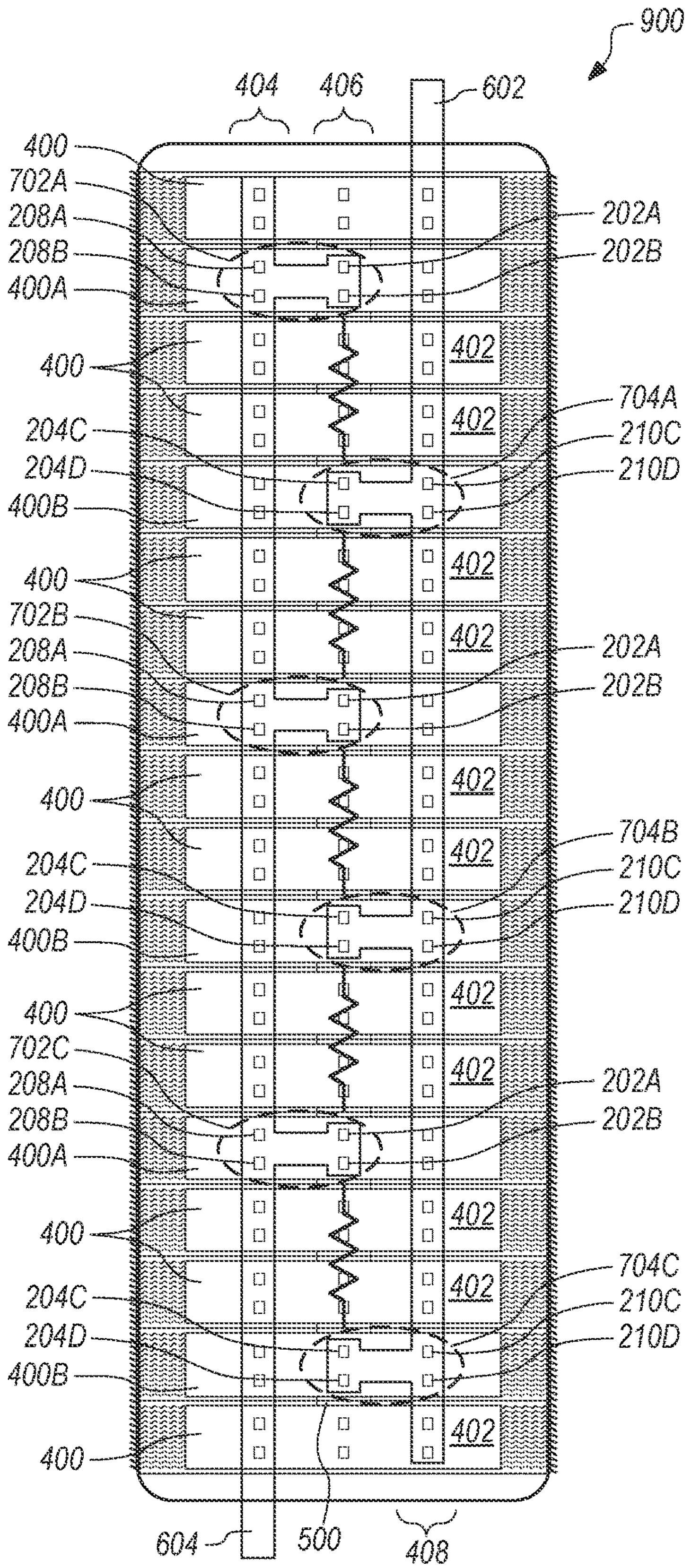
FIG. 9 illustrates a top view of a third cell in accordance with embodiments of the disclosure.

FIG. 9 illustrates a top view of a third cell 900 in accordance with embodiments of the disclosure. The third cell 900 includes multiple MEMS switches 400 electrically and mechanically coupled together by the beam link 500. In the example embodiment, the third cell 900 includes eighteen (18) MEMS switches 400 coupled together in parallel. Other embodiments are not limited to this configuration.

The first conductor 602 and the second conductor 604 are disposed traverse to (e.g., perpendicular to) the movable beams 402 and in parallel below the MEMS switches 400. Conductive vias (e.g., the fourth conductive vias 334 in FIG. 3) are used to connect the fourth conductive contacts 210 in the third set of conductive contacts 408 to the first conductor 602. Conductive vias (e.g., the first conductive vias 322 in FIG. 3) are used to connect the third conductive contacts 208 in the first set of conductive contacts 404 to the second conductor 604.

The third cell 900 further includes multiple first groups of first stage actuation contacts 702A, 702B, 702C in MEMS switches 400A and multiple second groups of first stage actuation contacts 704A, 704B, 704C in MEMS switches 400B. In the example embodiment, the first groups of first stage actuation contacts 702A, 702B, 702C are interposed between the second groups of first stage actuation contacts 704A, 704B, 704C. The first groups of first stage actuation contacts 702A, 702B, 702C and the second groups of first stage actuation contacts 704A, 704B, 704C may be arranged differently in other embodiments.

When the third cell 900 is actuated to the first stage of actuation, first conduction paths are established within the third cell 900. The first conduction paths resulting from each pair of adjacent first and second groups of first stage actuation contacts 702A+704A, 702B+704B, 702C+704C, 702B+704A, and 702C+704B are in parallel, and the total resistance will be reduced by a factor K, where K represents the number of the pairs of adjacent first and second groups of first stage actuation contacts (e.g., 702A+704A, 702B+704B, 702C+704C, 702B+704A, and 702C+704B).

Similar to FIG. 7, all of the conductive contacts in the first set of conductive contacts 404 (including the third conductive contacts 208 (e.g., 208A, 208B, 208C, 208D)) in the third cell 900 are operably connected to the second conductor 604 and some, but not all, of the first conductive contacts 202 (e.g., 202A, 202B) in the third cell 900 are operably connected to the second conductor 604 (e.g., in MEMS switches 400A). All of the conductive contacts in the third set of conductive contacts 408 (including the fourth conductive contacts 210 (e.g., 210A, 210B, 210C, 210D)) in the third cell 900 are operably connected to the first conductor 602 and some, but not all, of the second conductive contacts 204 (e.g., 204C, 204D) in the third cell 900 are operably connected to the first conductor 602 (e.g., in MEMS switches 400B).

Figure 10:
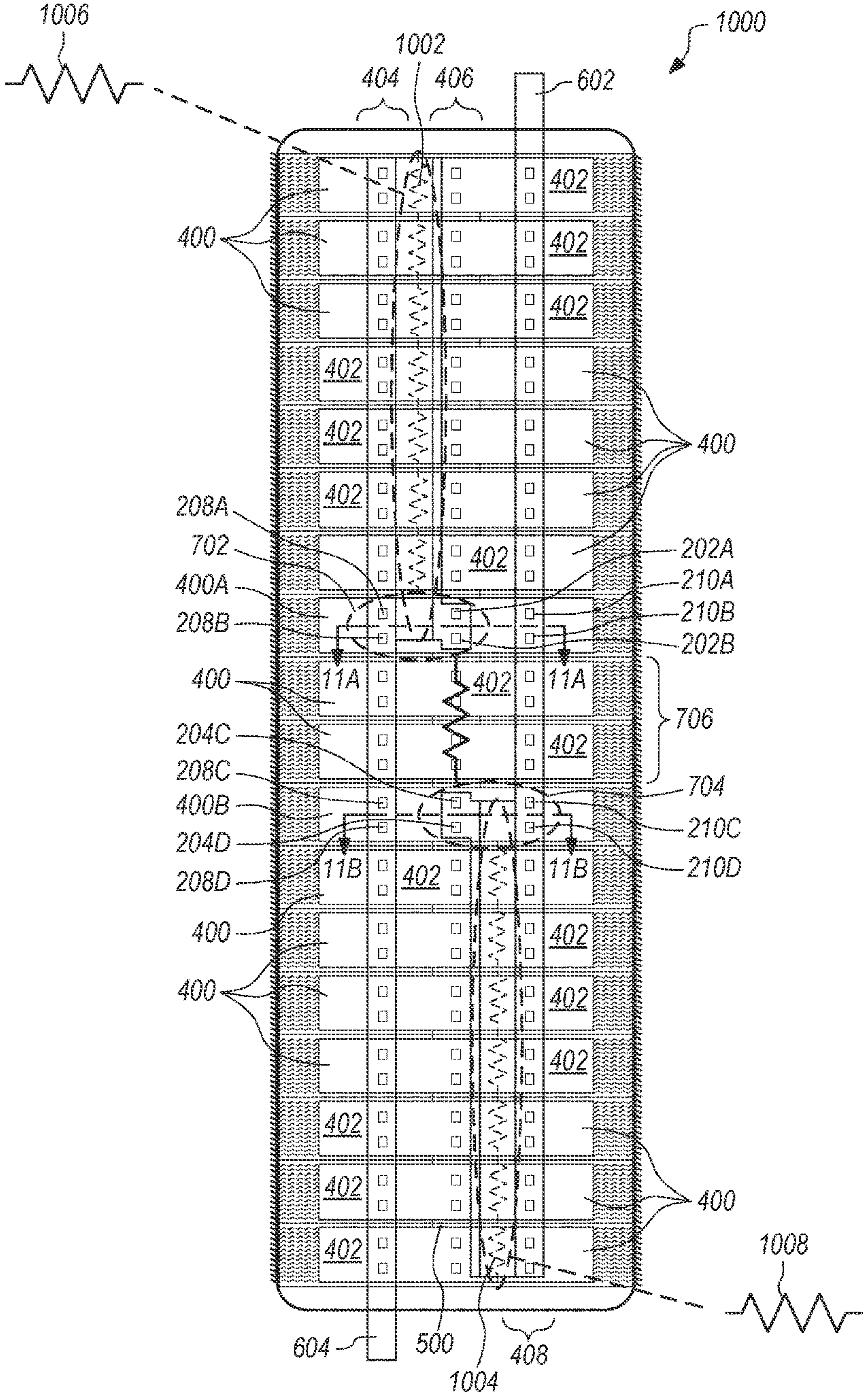
FIG. 10 illustrates a top view of a fourth cell in accordance with embodiments of the disclosure.

In some instances, a higher resistive path is desired in the first actuation stage. FIG. 10 illustrates a top view of a fourth cell 1000 in accordance with embodiments of the disclosure. The fourth cell 1000 is similar to the second cell 700 shown in FIG. 7 with the addition of one or more series resistors. In the example embodiment, the one or more series resistors are first series resistor 1002 and second series resistor 1004. The first series resistor 1002 includes a third resistor 1006 operably connected between a respective conductive contact in the first set of conductive contacts 404 and a corresponding conductive contact the second set of conductive contacts 406. For example, the third resistor 1006 is operably connected between the third conductive contacts 208A, 208B and the first conductive contacts 202A, 202B in the first group of first stage actuation contacts 702. The third resistor 1006 is included in a sequence of MEMS switches 400 (e.g., MEMS switches 400 next to each other) such that multiple third resistors 1006 are connected in series to produce the first series resistor 1002.

The second series resistor 1004 includes a fourth resistor 1008 operably connected between a respective conductive contact in the second set of conductive contacts 406 and a corresponding conductive contact in the third set of conductive contacts 408. For example, a fourth resistor 1008 is operably connected between the second conductive contacts 204C, 204D and the fourth conductive contacts 210C, 210D in the second group of first stage actuation contacts 704. The fourth resistor 1008 is included in a sequence of MEMS switches 400 (e.g., MEMS switches 400 next to each other) such that multiple fourth resistors 1008 are connected in series to produce the second series resistor 1004.

The first group of first stage actuation contacts 702 of the MEMS switch 400A is operably connected to the second conductor 604 through the first series resistor 1002. The second group of first stage actuation contacts 704 of the MEMS switch 400B is operably connected to the first conductor 602 through the second series resistor 1004. In this manner, the first series resistor 1002 and the second series resistor 1004 increase the resistance of the first conduction path.

The first series resistor 1002 and the second series resistor 1004 can be implemented using standard semiconductor fabrication processes such as doped polysilicon or other conductive materials, with different levels of resistivity (low resistivity or high resistivity). The resistivity and the geometry of the conductive materials (e.g., polysilicon) define the level of resistivity, thereby giving a designer the freedom to set the value of the resistance. When the fourth cell 1000 is actuated to the first stage of actuation, the first conduction path within the fourth cell 1000 is established through the first and the second groups of first stage actuation contacts 702, 704, the first and the second series resistors 1002, 1004, and the resistance of the movable beam section 706. In general, due to the lack of parallelization in the first conduction path, the value of the total reduction resistance $R_{RED}$ can be higher than the on state cell resistance $R_{ON}$, but the actual value is a function of: the resistances of the first and the second groups of first stage actuation contacts 702, 704; the resistivity of the material in the movable beam 402; the geometry of the movable beam 402; the resistivity of the material in first and the second series resistors 1002, 1004; and the geometry of the first and the second series resistors 1002, 1004.

Figure 11A:
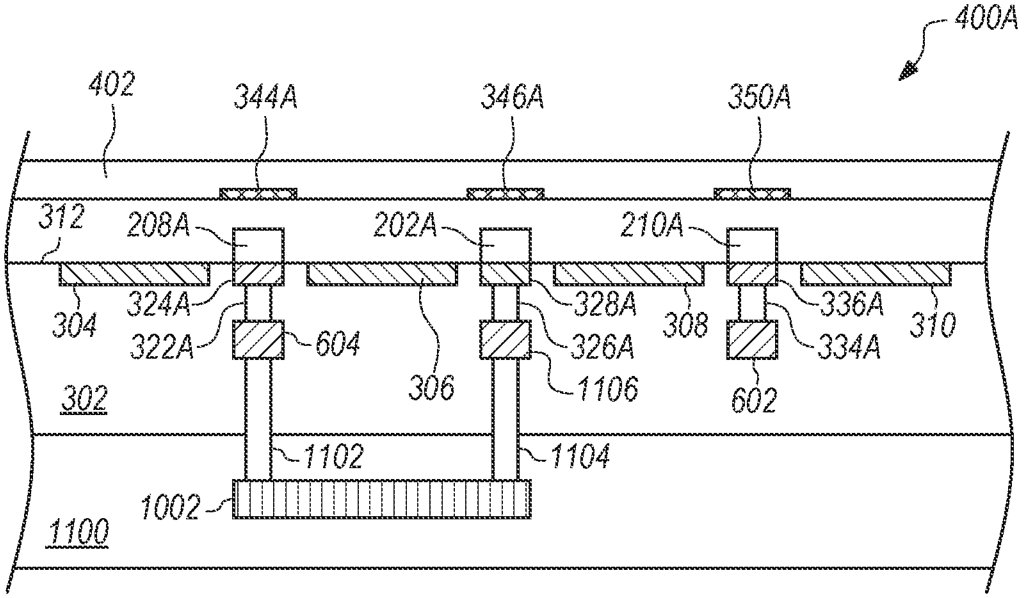
FIG. 11A illustrates a vertical cross-sectional view of a portion of the MEMS switch taken along line 11A-11A in FIG. 10 in accordance with embodiments of the disclosure.

FIG. 11A illustrates a vertical cross-sectional view of a portion of the MEMS switch 400A taken along line 11A-11A in FIG. 10 in accordance with embodiments of the disclosure. The MEMS switch 400A is similar to the MEMS switch 400A in FIG. 8A, with the addition of the first series resistor 1002 in a second substrate 1100 that is attached to the first substrate 302. A fifth conductive via 1102 operably (e.g., electrically) connects the second conductor 604 to the first series resistor 1002. A sixth conductive via 1104 operably connects a third conductor 1106 to the first series resistor 1002. In certain embodiments, the third conductor 1106 is an RF conductor. Thus, the first series resistor 1002 is included in the first conduction path when the MEMS switch 400A is actuated to the first stage of actuation.

In certain embodiments, all of the conductive contacts in the first set of conductive contacts 404 (including the third conductive contacts 208 (e.g., 208A, 208B, 208C, 208D)) are operably connected to the second conductor 604 and some, but not all, of the first conductive contacts 202 (e.g., 202A, 202B) are operably connected to the third conductor 1106 (e.g., in MEMS switch 400A). Accordingly, all of the conductive contacts in the first set of conductive contacts 404 (including the third conductive contacts 208) are operably connected to the first series resistor 1002 and some, but not all, of the first conductive contacts 202 are operably connected to the first series resistor 1002.

Figure 11B:
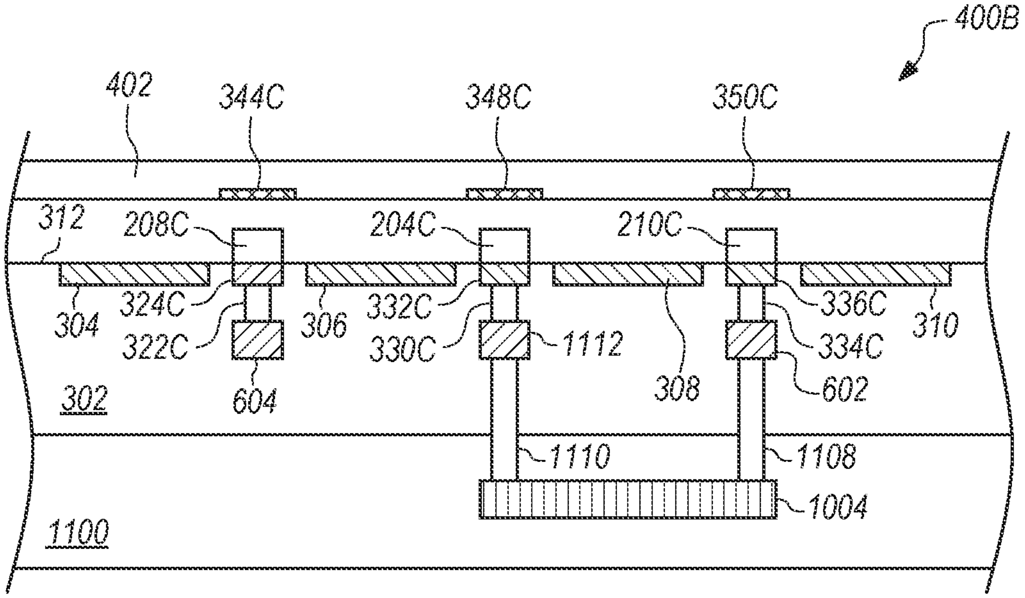
FIG. 11B illustrates a vertical cross-sectional view of a portion of the MEMS switch taken along line 11B-11B in FIG. 10 in accordance with embodiments of the disclosure.

FIG. 11B illustrates a vertical cross-sectional view of a portion of the MEMS switch 400B taken along line 11B-11B in FIG. 10 in accordance with embodiments of the disclosure. The MEMS switch 400B is similar to the MEMS switch 400B in FIG. 8B, with the addition of the second series resistor 1004 in the second substrate 1100. A seventh conductive via 1108 operably (e.g., electrically) connects the first conductor 602 to the second series resistor 1004. An eighth conductive via 1110 operably connects a fourth conductor 1112 to the second series resistor 1004. In certain embodiments, the fourth conductor 1112 is an RF conductor. Thus, the second series resistor 1004 is included in the first conduction path when the MEMS switch 400B is actuated to the first stage of actuation.

In certain embodiments, all of the conductive contacts in the third set of conductive contacts 408 (including the fourth conductive contacts 210 (e.g., 210A, 210B, 210C, 210D)) are operably connected to the first conductor 602 and some, but not all, of the second conductive contacts 204 (e.g., 204C, 204D) are operably connected to the fourth conductor 1112 (e.g., in MEMS switch 400B). Accordingly, all of the conductive contacts in the third set of conductive contacts 408 (including the fourth conductive contacts 210) are operably connected to the second series resistor 1004 and some, but not all, of the second conductive contacts 204 are operably connected to the second series resistor 1004.

Figure 12:
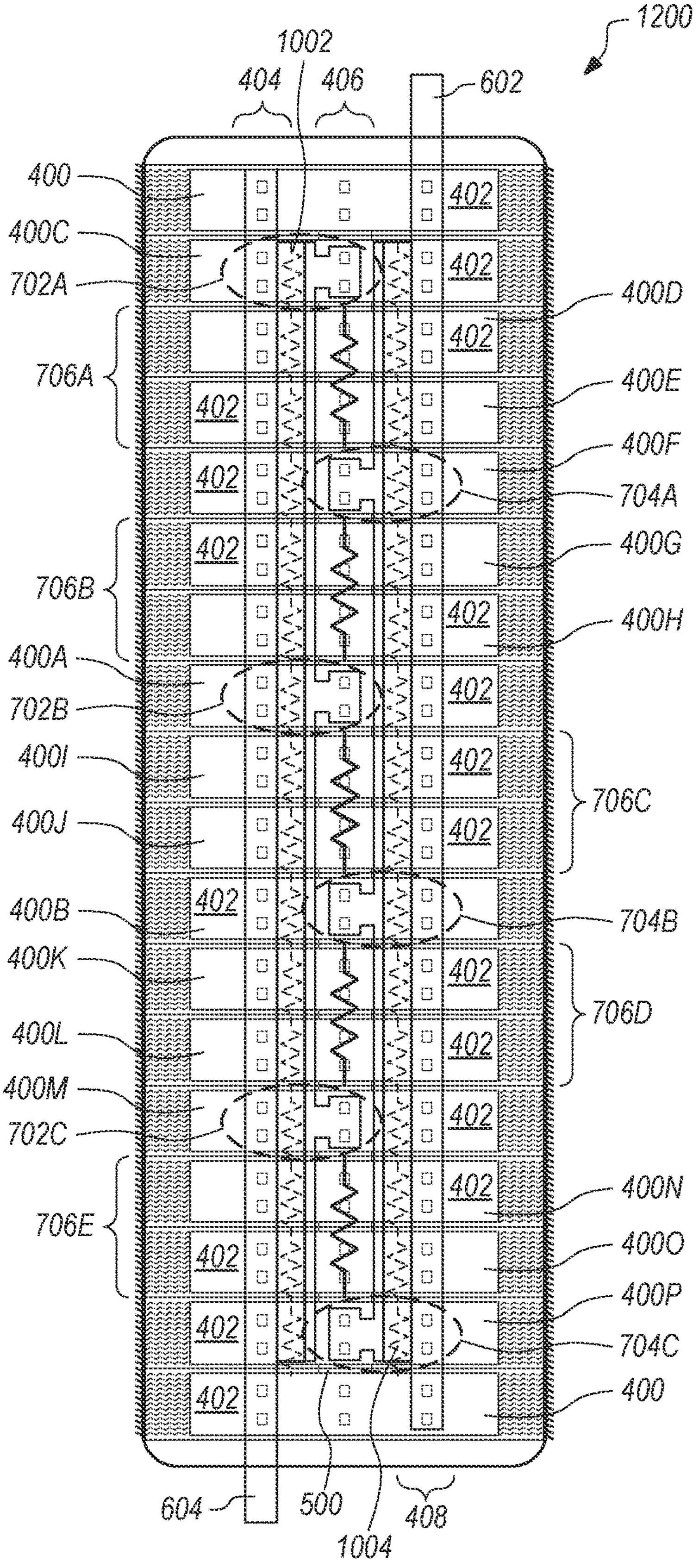
FIG. 12 illustrates a top view of a fifth cell in accordance with embodiments of the disclosure.

FIG. 12 illustrates a top view of a fifth cell 1200 in accordance with embodiments of the disclosure. The fifth cell 1200 is similar to the fourth cell 1000, but with the first series resistor 1002 and the second series resistor 1004 extending under multiple MEMS switches 400A-400P in the fifth cell 1200. Multiple first groups of first stage actuation contacts 702 are operably connected to the second conductor 604 and to the first series resistor 1002. Multiple second groups of first stage actuation contacts 704 are operably connected to the first conductor 602 and to the second series resistor 1004. Although not shown in FIG. 12, the fifth cell 1200 includes the third resistors 1006 and the fourth resistors 1008 shown in FIG. 10.

The portions of the movable beams 402 located between each pair of first group of first stage actuation contacts 702A,

702B, 702C and second group of first stage actuation contacts 704A, 704B, 704C form movable beam sections 706A, 706B, 706C, 706D, 706E. In the illustrated embodiment, the movable beam section 706A is established between the first group of first stage actuation contacts 702A and the second group of first stage actuation contacts 704A. The movable beam section 706B is established between the second group of first stage actuation contacts 704A and the first group of first stage actuation contacts 702B. The movable beam section 706C is established between the first group of first stage actuation contacts 702B and the second group of first stage actuation contacts 704B. The movable beam section 706D is established between the second group of first stage actuation contacts 704B and the first group of first stage actuation contacts 702C. The movable beam section 706E is established between the first group of first stage actuation contacts 702C and the second group of first stage actuation contacts 704C.

When the fifth cell 1200 is actuated to the first stage of actuation, a first conduction path within the fifth cell 1200 is created through the first groups of first stage actuation contacts 702A, 702B, 702C, the second groups of first stage actuation contacts 704A, 704B, 704C, the first series resistor 1002, the second series resistor 1004, and the movable beam sections 706A-706E of the movable beams 402 that are connected in parallel. The current inrush in each of the individual first stage conductive contacts (e.g., the first conductive contact 202 and the second conductive contact 204) is reduced by a factor of K compared to the embodiment shown in FIG. 10.

Similar to FIGS. 10-11B, all of the conductive contacts in the first set of conductive contacts 404 (including the third conductive contacts 208 (e.g., 208A, 208B, 208C, 208D)) are operably connected to the second conductor 604 and some, but not all, of the first conductive contacts 202 (e.g., 202A, 202B) are operably connected to the third conductor 1106 (e.g., in MEMS switches 400A, 400C, 400M). Accordingly, all of the conductive contacts in the first set of conductive contacts 404 (including the third conductive contacts 208) are operably connected to the first series resistor 1002 and some, but not all, of the first conductive contacts 202 are operably connected to the first series resistor 1002. All of the conductive contacts in the third set of conductive contacts 408 (including the fourth conductive contacts 210 (e.g., 210A, 210B, 210C, 210D)) are operably connected to the first conductor 602 and some, but not all, of the second conductive contacts 204 (e.g., 204C, 204D) are operably connected to the fourth conductor 1112 (e.g., in MEMS switches 400B, 400F, 400P). Accordingly, all of the conductive contacts in the third set of conductive contacts 408 (including the fourth conductive contacts 210) are operably connected to the second series resistor 1004 and some, but not all, of the second conductive contacts 204 are operably connected to the second series resistor 1004.

Figure 13:
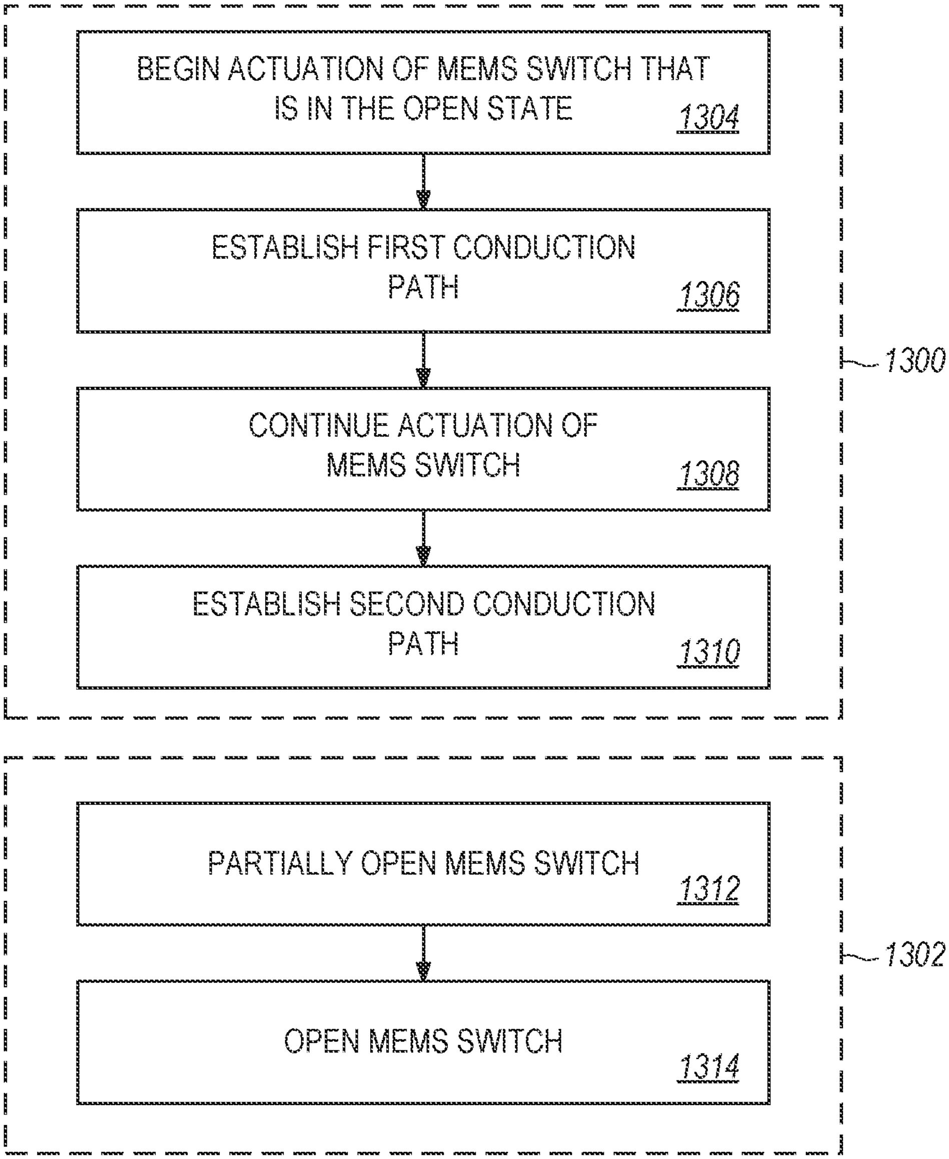
FIG. 13 illustrates a method of operating a MEMS switch in accordance with embodiments of the disclosure.

FIG. 13 illustrates a method of operating a MEMS switch in accordance with embodiments of the disclosure. The method is described in conjunction with a single MEMS switch, but the method can be used concurrently with multiple MEMS switches. The method includes operations to close a MEMS switch 1300 and to open a MEMS switch 1302.

Initially, the MEMS switch is in an open or off state and actuation of the MEMS switch begins (block 1304). As described earlier, a power signal (e.g., a voltage signal) is applied to pull-down electrodes to initiate and maintain the activation of the MEMS switch. The first conduction path is established at block 1306. As described earlier, the first conduction path is created when the movable beam in the MEMS switch deforms to a first point to contact the first set of conductive contacts in the MEMS switch (e.g., the first conductive contact 202 and the second conductive contact 204). At the first point, the MEMS switch is in a partially closed state.

After the first conduction path is established, actuation of the MEMS switch continues at block 1308. The actuation of the MEMS switch continues by maintaining the application of the power signal on the pull-down electrodes. The second conduction path is created at block 1310. As described previously, the second conduction path is established when the movable beam deforms to a second point to contact both the first set of conductive contacts and the second set of conductive contacts (e.g., the third conductive contact 208 and the fourth conductive contact 210) in the MEMS switch. At the second point, the MEMS switch is in an on or closed state.

To open the MEMS switch 1302, actuation of the MEMS switch ends and the MEMS switch transitions to a partially open state (block 1312). In the partially open state, the movable beam begins to straighten (e.g., unbend) such that the movable beam does not contact the second set of conductive contacts. Thereafter, the MEMS switch transitions to the open or off state (block 1314). In the open state, the movable beam does not contact both the first set of conductive contacts and the second set of conductive contacts.

It is contemplated that any of the foregoing aspects, and/or various separate aspects and features as described herein, may be combined for additional advantage. Any of the various embodiments as disclosed herein may be combined with one or more other disclosed embodiments unless indicated to the contrary herein.

Those skilled in the art will recognize improvements and modifications to the preferred embodiments of the present disclosure. All such improvements and modifications are considered within the scope of the concepts disclosed herein and the claims that follow.

What is claimed is:

1. A microelectromechanical system (MEMS) switch, comprising:

- a first conductive contact disposed over a substrate;
- a second conductive contact disposed over the substrate, the first conductive contact and the second conductive contact forming a first set of conductive contacts;
- a third conductive contact disposed over the substrate;
- a fourth conductive contact disposed over the substrate, the third conductive contact and the fourth conductive contact forming a second set of conductive contacts, wherein the first set of conductive contacts are positioned between the third conductive contact and the fourth conductive contact; and
- a movable beam suspended over the first set of conductive contacts and the second set of conductive contacts, wherein:
  - the first set of conductive contacts and the movable beam are operable to create a first conduction path when the movable beam contacts the first set of conductive contacts; and
  - the second set of conductive contacts and the movable beam are operable to create a second conduction path when the movable beam contacts the second set of conductive contacts.

2. The MEMS switch of claim 1, further comprising:

- a signal source operably connected to the third conductive contact; and a load operably connected to the fourth conductive contact.

3. The MEMS switch of claim 1, further comprising:

a first resistor operably connected between the third conductive contact and the first conductive contact; and a second resistor operably connected between the second conductive contact and the fourth conductive contact.

4. The MEMS switch of claim 3, further comprising:

a signal source operably connected to the third conductive contact; and a load operably connected to the fourth conductive contact.

5. The MEMS switch of claim 1, further comprising:

a first attachment mechanism operable to attach a first end of the movable beam to a first anchor; and a second attachment mechanism operable to attach a second end of the movable beam to a second anchor.

6. The MEMS switch of claim 5, wherein the first attachment mechanism and the second attachment mechanism each comprise springs.

7. A method of operating a microelectromechanical system (MEMS) switch, the method comprising:

initiating actuation of the MEMS switch;

establishing a first conduction path between a first set of conductive contacts and a movable beam when the movable beam contacts the first set of conductive contacts during a first stage of actuation of the MEMS switch; and establishing a second conduction path between a second set of conductive contacts and the movable beam when the movable beam contacts the second set of conductive contacts during a second stage of actuation of the MEMS switch.

8. The method of claim 7, wherein:

the MEMS switch is in a closed state in the second stage of actuation; and the method further comprises transitioning the MEMS switch to an open state.

* * * * *